United States Patent
Neuber et al.

(10) Patent No.: US 12,168,961 B2
(45) Date of Patent: Dec. 17, 2024

(54) METHOD FOR OPERATING AN INTERNAL COMBUSTION ENGINE, AND INTERNAL COMBUSTION ENGINE

(71) Applicant: Woodward L'Orange GmbH, Stuttgart (DE)

(72) Inventors: Felix Neuber, Gerwisch (DE); Anko Ernst, Magdeburg (DE); Sergey Shikula, Magdeburg (DE); Heinrich Nowak, Ludwigsburg (DE)

(73) Assignee: Woodward L'Orange GmbH

( * ) Notice: Subject to any disclaimer, the term of this patent is extended or adjusted under 35 U.S.C. 154(b) by 0 days.

(21) Appl. No.: 18/273,179

(22) PCT Filed: Jan. 19, 2022

(86) PCT No.: PCT/EP2022/051083
§ 371 (c)(1),
(2) Date: Aug. 29, 2023

(87) PCT Pub. No.: WO2022/157171
PCT Pub. Date: Jul. 28, 2022

(65) Prior Publication Data
US 2024/0084744 A1    Mar. 14, 2024

(30) Foreign Application Priority Data
Jan. 19, 2021 (DE) .......................... 102021200464.4

(51) Int. Cl.
*F02D 19/06* (2006.01)
*F02D 13/02* (2006.01)
(Continued)

(52) U.S. Cl.
CPC ..... *F02D 19/0605* (2013.01); *F02D 13/0203* (2013.01); *F02D 19/061* (2013.01);
(Continued)

(58) Field of Classification Search
CPC ............ F02D 19/0605; F02D 13/0203; F02D 19/061; F02D 19/10; F02D 35/02;
(Continued)

(56) References Cited

U.S. PATENT DOCUMENTS

| | | | |
|---|---|---|---|
| 6,073,862 | A | 6/2000 | Touchette et al. |
| 9,382,857 | B2 | 7/2016 | Glugla et al. |

(Continued)

FOREIGN PATENT DOCUMENTS

| | | |
|---|---|---|
| DE | 69918141 | 3/2005 |
| DE | 102014118588 | 6/2015 |

(Continued)

OTHER PUBLICATIONS

International Preliminary Report on Patentability in International Application No. PCT/EP2022/051083, mailed on Aug. 3, 2023, 17 pages (with English Translation).

(Continued)

*Primary Examiner* — Sizo B Vilakazi
(74) *Attorney, Agent, or Firm* — Fish & Richardson P.C.

(57) ABSTRACT

The invention relates to a method for operating an internal combustion engine (1), which comprises at least one combustion chamber (3) and an injector (5) which is assigned to the combustion chamber (3) and intended for introducing a first gaseous fuel into the combustion chamber (3), wherein a second liquid fuel is used for operation of the injector (5), wherein in a start-up operation of the internal combustion engine (1) the injector (5) is actuated in at least one operational cycle, avoiding complete combustion of the fuel introduced into the combustion chamber (3) via the injector (5).

19 Claims, 2 Drawing Sheets

Figure 1:
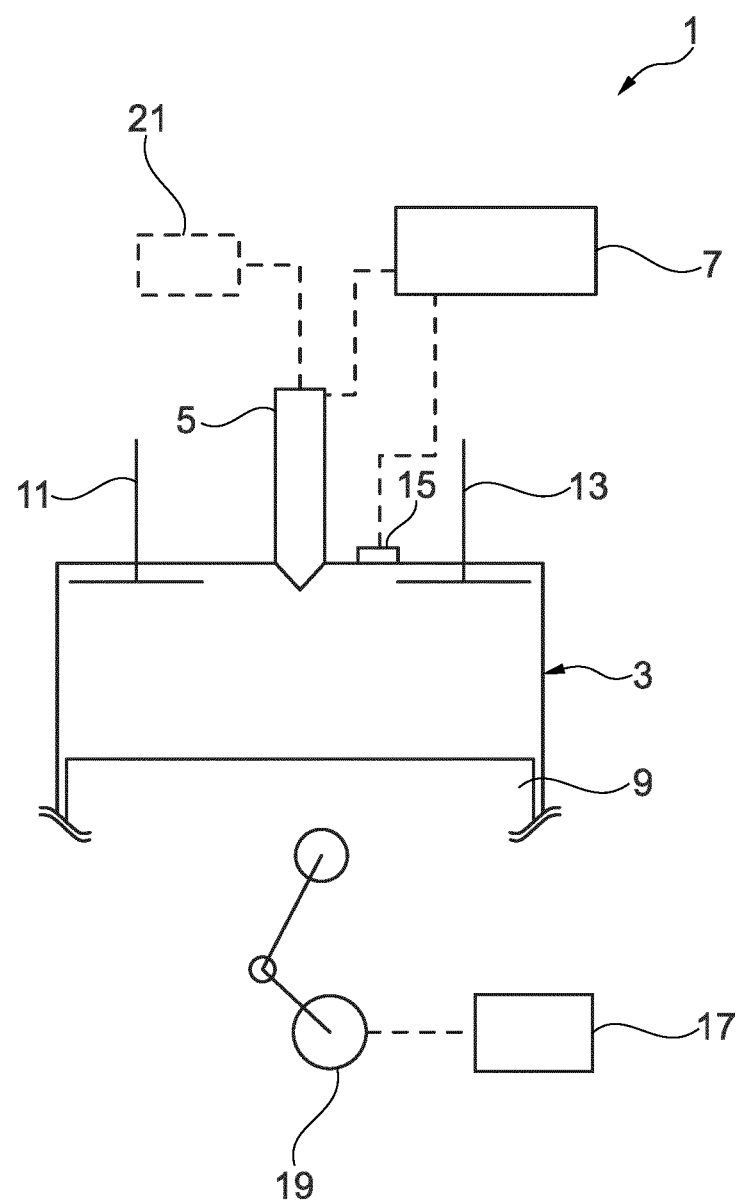

(51) Int. Cl.
*F02D 19/10* (2006.01)
*F02D 35/02* (2006.01)
*F02D 41/06* (2006.01)
*F02D 41/40* (2006.01)

(52) U.S. Cl.
CPC ............. *F02D 19/10* (2013.01); *F02D 35/02* (2013.01); *F02D 41/062* (2013.01); *F02D 41/40* (2013.01)

(58) Field of Classification Search
CPC .................. F02D 41/062; F02D 41/40; F02D 2200/0602; F02D 13/0261; F02D 19/0694; F02D 35/023; F02D 41/401; Y02T 10/30
See application file for complete search history.

(56) References Cited

U.S. PATENT DOCUMENTS

| | | | |
|---|---|---|---|
| 10,859,019 | B2 | 12/2020 | Fei et al. |
| 11,674,464 | B2 * | 6/2023 | Zhang .................... F02D 41/40 701/105 |
| 2013/0081593 | A1 * | 4/2013 | Coldren ............. F02M 63/0045 123/304 |
| 2013/0098333 | A1 * | 4/2013 | Kim .................... F02D 19/0694 123/445 |
| 2015/0167576 | A1 * | 6/2015 | Glugla ................. F02D 41/405 123/295 |

FOREIGN PATENT DOCUMENTS

| | | |
|---|---|---|
| DE | 102018203542 | 9/2019 |
| DE | 102018208865 | 12/2019 |

OTHER PUBLICATIONS

International Search Report and Written Opinion in International Application No. PCT/EP2022/051083, mailed on May 12, 2022, 22 pages (with English Translation).

* cited by examiner

METHOD FOR OPERATING AN INTERNAL COMBUSTION ENGINE, AND INTERNAL COMBUSTION ENGINE

This application is a U.S. National Stage of and claims benefit of priority to PCT/EP2022/051083, filed Jan. 19, 2022, which claims benefit of German Application 102021200464.4, filed Jan. 19, 2021, the contents of which are incorporated by reference herein.

The invention relates to a method for operating an internal combustion engine and an internal combustion engine which is configured to be operated with such a method.

An internal combustion engine operated with such a method has at least one combustion chamber and an injector assigned to the combustion chamber, which is configured to introduce a first gaseous fuel into the combustion chamber. For the operation of the injector, a second liquid fuel is used, for example as a control oil for actuating the injector or as a sealing oil for sealing the injector. If the injector is designed as a two-component injector and is configured to introduce a pilot fuel in addition to the first gaseous fuel into the combustion chamber for the purpose of inflaming the first gaseous fuel, the second, liquid fuel is used as a pilot fuel in addition or alternatively to its use as a control and/or sealing oil.

In this case, there is the problem that, due to various fault scenarios, an increased mass fraction of the second, liquid fuel can occur in the combustion chamber, for example by undesired control and/or sealing oil leakages or by way of construction-related or wear-related impairments of the operation of the injector. The second liquid fuel typically has a higher calorific value compared to the first gaseous fuel. As a result of the undesirably increased energy input, mechanical damage to the internal combustion engine is then to be expected. An increased risk of such an undesired entry of an increased quantity of the second liquid fuel into the combustion chamber exists in particular when the injector is put into operation after a standstill of the internal combustion engine.

The object of the invention is to provide a method for operating an internal combustion engine and an internal combustion engine, in which the mentioned disadvantages are at least reduced or avoided.

The object is achieved by providing the present technical teaching, in particular the teaching of the independent claims and the embodiments disclosed in the dependent claims and the description.

The object is achieved in particular in that, in a start-up operation of the internal combustion engine, the injector is actuated in at least one operational cycle avoiding complete combustion of the fuel introduced into the combustion chamber via the injector. In an advantageous manner, a second liquid fuel, which is accumulated, in particular during a standstill of the internal combustion engine, within the injector, is initially expelled into the combustion chamber without the fuel being burned, or at least without being completely burned. In this way, in particular in the start-up operation of the internal combustion engine, inadmissibly high combustion end pressures are avoided so that the risk of component damage is also reduced, preferably prevented. By actuating the injector according to the invention, it is in particular virtually purged clean. This means in particular that undesired leakage quantities of the second liquid fuel are eliminated before the internal combustion engine is put into operation and/or a regular combustion is started in the combustion chamber.

A fuel is understood here to mean a combustible substance or a combustible substance mixture. A combustible substance mixture comprises at least one combustible material.

A gaseous fuel is in particular a combustible substance or a combustible substance mixture which is gaseous under normal conditions, i.e., in particular at 25° C. and 1013 mbar. The first gaseous fuel preferably has at least one substance or consists of a substance selected from a group consisting of: methane, propane and hydrogen. In a preferred embodiment, the first gaseous fuel is natural gas, in particular liquefied natural gas (LNG) or compressed natural gas (CNG), biogas, sewage gas, landfill gas, a process gas of the chemical industry, a process or exhaust gas of the steel, mining or metallurgical industry, a raw material trace gas, a flare gas, a weak gas or a special gas.

A liquid fuel is understood in particular to mean a combustible substance or a combustible substance mixture which is liquid under standard conditions, in particular at 25° C. and 1013 mbar. The second liquid fuel is preferably an ignition oil, in particular diesel or dimethyl ether. In particular diesel can readily be used as control and/or sealing oil for the injector.

The first gaseous fuel is preferably used as a main fuel for the operation of the internal combustion engine. This means in particular that a main portion of the chemical energy introduced into the combustion chamber in total per operational cycle is introduced via the first gaseous fuel, preferably more than 80%, preferably more than 90%, preferably more than 95%, preferably more than 97% of the chemical energy introduced into the combustion chamber per operational cycle. It is also preferably possible for 100% of the chemical energy introduced into the combustion chamber per operational cycle to be introduced via the injector in the form of the first gaseous fuel. In this case, the second liquid fuel is preferably used only as control and/or sealing oil for the operation of the injector.

It is preferably possible for the second, liquid fuel to be used—in particular exclusively—as control oil for actuating the injector.

Alternatively or additionally, the second liquid fuel is used—in particular exclusively—as sealing oil for the injector.

Alternatively or additionally, the second liquid fuel is introduced into the combustion chamber as a pilot fuel, —in particular exclusively. It is preferably possible for the second liquid fuel to be introduced into the combustion chamber via a separate, second injector. In a particularly preferred embodiment, however, the second liquid fuel is introduced, as a pilot fuel, into the combustion chamber via the same injector as for the first gaseous fuel. In this case, the injector is preferably designed as a two-component injector.

The injector preferably has fuel circuits separated fluidically from one another at least in regions, in particular a control oil circuit and a sealing oil circuit which can be set under different fuel pressures, wherein the pressure build-up in the individual fuel circuits can take place separately and in particular in succession. In particular, a fuel path for the first, gaseous fuel is preferably fluidically separated within the injector from the control oil circuit and/or sealing oil circuit and the fuel pressure for the first gaseous fuel can be built up in time and with respect to the pressure value to be reached independently of the control oil pressure and/or the sealing oil pressure.

The fact that the injector is actuated means in particular that the injector is actuated, in particular controlled, for introducing fuel, in particular for introducing the first gaseous fuel. In this way, the first, gaseous fuel can also be used to expel the second undesirable liquid fuel into the combustion chamber. It is preferably possible for the injector designed as a two-component injector to also be actuated for introducing the second liquid fuel as a pilot fuel into the combustion chamber.

The fact that the injector is actuated while avoiding a complete combustion of the fuel introduced into the combustion chamber via the injector means in particular that the actuation takes place in such a way that no combustion takes place in the combustion chamber, or that the actuation takes place in such a way that the fuel introduced into the combustion chamber is only partially combusted. In any case, the actuation takes place such that the fuel introduced into the combustion chamber is not completely combusted.

In the start-up operation, the internal combustion engine is preferably moved by a starter, in particular an electric starter motor. Alternatively or additionally, it is possible for the internal combustion engine to be driven by pressurized gas, for example compressed air, or in another way while avoiding complete combustion in the at least one combustion chamber. In particular, in the start-up operation, the power necessary for rotating the internal combustion engine is not provided or at least not substantially provided by combustion in the at least one combustion chamber.

The at least one operational cycle in which the injector is actuated in the start-up operation is preferably a first operational cycle in which the injector is actuated when the internal combustion engine is put into operation. The injector is thus advantageously purged at its first actuation.

After completion of the start-up operation of the internal combustion engine, the injector is preferably actuated in a normal mode for a regular operation of the internal combustion engine.

Preferably, the start-up operation is ended after at least 2 to at most 20 operational cycles. In particular, the injector is no longer actuated in the start-up operation after at least 2 to at most 20 operational cycles, but rather in the normal mode for regular operation of the internal combustion engine.

According to a development of the invention, it is provided that in the start-up operation, the injector is actuated in the at least one operational cycle at an actuation time within the operational cycle at which no ignition conditions for the second, liquid fuel are present in the combustion chamber. In this way, combustion of the fuel introduced into the combustion chamber is advantageously completely prevented, in particular since the first gaseous fuel can also typically not be ignited if no ignition conditions for the second, liquid fuel are present.

Alternatively, the injector is actuated in the start-up operation in the at least one operational cycle preferably at an actuation time within the operational cycle, and it is additionally ensured that the fuel introduced via the injector is at most partially converted. In this way, it is advantageously ensured that the fuel introduced into the combustion chamber burns only partially, but in no way completely. The fact that the fuel is at most partially converted means in particular that the introduced fuel is not completely converted. The fact that the fuel is converted means in particular that the fuel is combusted.

A control time is understood here to mean, in particular, a relative time within the operational cycle. This can be specified as time after a predetermined reference time within the operational cycle or a fixed reference event within the operational cycle, then depending on an instantaneous rotational speed of the internal combustion engine. The actuation time is preferably specified as crankshaft angle, in ° CA.

If the internal combustion engine is designed as a two-stroke engine, an operational cycle extends in the usual manner from 0° C.A to 360° C.A; if the internal combustion engine is designed as a four-stroke engine, an operational cycle extends in the usual way from 0° C.A to 720° C.A, thus comprises two full revolutions of the crankshaft. The actuation time is preferably an injection time or spraying time, in particular a point in time, which is also usually referred to as a "begin of injection" (BOI) or injection start.

According to a development of the invention, it is provided that in the start-up operation the injector is actuated in a plurality of operational cycles while avoiding complete combustion of the fuel introduced into the combustion chamber via the injector. In particular, in the start-up operation, the injector is preferably actuated in a plurality of operational cycles at a control time within the respective operational cycle, and no ignition conditions for the second fuel are present in the combustion chamber, or it is additionally ensured that the fuel introduced via the injector is at most partially converted. If the injector is actuated in a plurality of operational cycles in such a way, it is advantageously particularly efficiently purged so that excessive load on the internal combustion engine due to impermissibly high combustion end pressures is avoided with high safety.

The plurality of operational cycles are particularly preferably directly successive operational cycles. In particular, these operational cycles are preferably the first operational cycles in which the injector is actuated at all after the internal combustion engine has been put into operation.

Preferably, in the start-up operation, the injector is controlled in at least 2 to at most 20 operational cycles while avoiding complete combustion of the fuel introduced into the combustion chamber via the injector. In particular, the start-up operation is preferably maintained for at least 2 to at most 20 operational cycles.

Alternatively or additionally, it is also possible for the injector to be actuated several times in at least one operational cycle during start-up operation. In particular, the injector can be actuated in a clocked manner in a single operational cycle. In this way too, the injector can be purged very efficiently.

According to a development of the invention, it is provided that the injector is actuated during the start-up operation during a valve overlap phase. This has the advantage that, on the one hand, during the valve overlap phase certainly no ignition conditions for the second fuel are present in the combustion chamber, wherein, on the other hand, there is typically a strong flow out of the combustion chamber during the valve overlap phase, which flow reliably conveys the unburned fuel out of the combustion chamber, so that an impermissibly high load on the combustion chamber can be avoided with great certainty.

Valve overlap phase is in particular a time or crankshaft angle range within the operational cycle in which both an inlet valve assigned to the combustion chamber for introducing fresh mass, in particular combustion air, into the combustion chamber as well as an outlet valve assigned to the combustion chamber, which is configured to discharge exhaust gas from the combustion chamber, are open. In particular, the valve overlap phase is preferably a crankshaft angle range, which includes a top dead center of a piston that can be moved with a stroke in the combustion chamber, wherein this top dead center is associated with an intake stroke of the operational cycle, i.e., the intake stroke of the operational cycle follows this top dead center. This top dead center is referred to below as intake TDC. The valve overlap phase preferably extends from at least 50° C.A before intake TDC to at most 50° C.A after intake TDC, preferably from at least 45° C.A before intake TDC to at most 45° C.A after intake TDC, preferably from at least 40° C.A before intake TDC to at most 40° C.A after intake TDC, in a particularly preferred embodiment from at least 46° C.A before intake TDC to at most 43° C.A after intake TDC.

Alternatively, it is preferably provided that the injector is actuated during start-up operation after a top dead center associated to an expansion stroke of the piston that is displaceable in the combustion chamber along a stroke movement. In particular, the expansion stroke follows this top dead center. This top dead center is referred to below as expansion TDC. The expansion stroke is in particular the operating stroke of the operational cycle. If the fuel is introduced into the combustion chamber sufficiently late after the expansion TDC, it is ensured that the fuel introduced into the combustion chamber is at least not completely, i.e., at most partially converted. If necessary, the combustion is even completely avoided.

In a preferred embodiment, in the start-up operation, the injector is actuated in an interval from at least 15° C.A up to at most 50° C.A after expansion TDC, preferably at least 20° C.A to at most 40° C.A after expansion TDC, preferably at least 25° C.A up to at most 35° C.A after expansion TDC, preferably at 30° C.A after expansion TDC.

According to a further development of the invention, it is provided that the actuation time, at which the injector is actuated in start-up operation after expansion TDC, is selected as a function of a prognosis regarding a maximum fuel quantity of the second liquid fuel introduced via the injector. In this way, the actuation time can be tuned to the anticipated hazard to the internal combustion engine by the second liquid fuel. The prognosis is produced in particular with respect to the maximum second liquid fuel introduced into the combustion chamber via the fuel path for the first gaseous fuel. It is therefore assumed that a certain leakage quantity of the second, liquid fuel penetrates into the fuel path for the first, gaseous fuel and then, when the injector is activated, is brought together with it into the combustion chamber. This fuel quantity can be known from bench tests or can be estimated depending on the design and/or wear for the injector.

A fuel quantity is understood here to mean, in particular, a fuel mass.

In particular, the actuation time is selected as a function of the predicted maximum introduced fuel quantity of the second fuel in relation to a predetermined maximum mechanical load on the combustion chamber. In particular, it can be determined by this consideration which portion of the second liquid fuel can still be combusted safely in the combustion chamber without damage occurring, and the actuation time can be selected accordingly. In this way, an emission of an excessively large quantity of unburned fuel into the surroundings of the internal combustion engine is advantageously avoided.

Preferably, a prognosis of the maximum introduced fuel quantity of the second fuel is initially generated, a prediction of a combustion pressure value, in particular a temporal combustion pressure curve or a combustion pressure maximum, is in turn generated therefrom. This combustion pressure value is then compared with a maximum permissible combustion pressure value which describes the maximum mechanical load of the combustion chamber, in particular with a maximum permissible temporal combustion pressure profile or a maximum permissible combustion pressure maximum. Depending on this comparison, the actuation time is then suitably selected in such a way that the maximum permissible combustion pressure value is not reached, wherein it is preferably considered that as large an amount of the second fuel as possible is still combusted in the combustion chamber and therefore not to be discharged unburned into the surroundings of the internal combustion engine.

According to a further development of the invention, it is provided that the injector is actuated in the start-up operation only after a predetermined limit rotational speed has been reached or exceeded. In this way, it can particularly advantageously be ensured that the fuel introduced into the combustion chamber is effectively conveyed out of the combustion chamber via the outlet valve. In particular, the actuation of the injector is started only after a start-up phase of the starter if it has reached a starter speed as a predetermined limit speed.

According to a development of the invention, it is provided that the injector is only activated in the start-up operation when a pressure in a fuel supply system for the injector has reached or exceeded a first fuel pressure limit value for the first fuel and a second fuel pressure limit value for the second fuel. In this way, it is advantageously ensured that the present second, liquid fuel, in particular leakage quantities of the second liquid fuel, are reliably expelled.

Preferably, a pressure build-up in the fuel supply system, in particular for the first fuel and/or for the second fuel, is monitored. In particular, a temporal pressure development is preferably monitored. In particular, the pressure for the various fuels, in particular for the different fuel circuits, is preferably built up in a predetermined sequence. Preferably, the sequence is monitored. The actuation of the injector is preferably carried out only when the pressure build-up is detected as being correct, in particular if the pressure build-up follows predetermined criteria, in particular within predetermined limits.

In particular, the sealing oil pressure is preferably first built up, then the control oil pressure, and at last the pressure in the fuel path for the first gaseous fuel are built up.

According to a further development of the invention, it is provided that the actuation time at which the injector is actuated in the start-up operation, after a predetermined number of actuations of the injector, in particular after a predetermined number of operation cycles, in which the injector is actuated, is anticipated stepwise until combustion in the combustion chamber is detected. In particular, the actuation time is preferably displaced stepwise so as to be advanced from its predetermined position after the expansion TDC. In this case, an "advanced" displacement of the actuation time means in particular that the actuation time is displaced closer to the expansion TDC starting from its current position, that is to say in particular the crankshaft angle distance to the expansion TDC is reduced. As a result, the pressure prevailing in the combustion chamber at the actuation time rises stepwise until ignition conditions for the second, liquid fuel are present in the combustion chamber. If this is the case, the second liquid fuel is ignited, wherein thereby the first gaseous fuel is in turn also ignited. Combustion takes place in the combustion chamber.

A pressure sensor, via which a combustion chamber pressure in the combustion chamber is detected, is preferably assigned to the combustion chamber. In particular, the combustion chamber pressure is preferably detected in a time-dependent manner. In particular, a temporal combustion chamber pressure profile or combustion pressure profile is preferably detected. On the basis of the combustion chamber pressure, in particular the temporal combustion chamber pressure profile, combustion in the combustion chamber can be inferred. In particular, the combustion can be detected on the basis of the combustion chamber pressure, in particular on the basis of the temporal combustion pressure profile.

Preferably, the combustion chamber pressure is also monitored during regular operation or normal operation of the internal combustion engine. In a particularly preferred manner, in normal operation of the internal combustion engine, a development of the temporal combustion chamber pressure profile dependent on the instantaneous operating time of the injector is monitored as a function of instantaneous actuation parameters for the injector. Depending on defined limit values, for example for an absolute value of the temporal combustion chamber pressure profile, a variance of the temporal combustion chamber pressure profile, and the like, it is then possible, if appropriate, also in normal operation, to adjust the actuation time in the late, in order to protect the combustion chamber. An emergency operation of the internal combustion engine, for example for implementing an emergency run function (Limp Home Mode), is also possible, wherein advantageously damage to the internal combustion engine is avoided. This emergency operation can advantageously be combined with ancillary measures, for example a visualization via a display device accessible to an operator of the internal combustion engine.

According to a further development of the invention, it is provided that the actuation time is set to an ignition operating value if a combustion in the combustion chamber is detected during or after the stepwise early displacement of the actuation time. In this case, the starting operating value is a value for the actuation time which is suitable for an actual ignition, fire-up or start-up of the internal combustion engine, i.e., in particular an acceleration of the internal combustion engine starting from the starter speed up to an idling speed or nominal rotational speed, wherein the necessary power is provided by combustion in the at least one combustion chamber. In particular, at this time, the Starter is mechanically separated from the internal combustion engine and/or deactivated.

After reaching the idle speed or nominal rotational speed, the actuation time is preferably set to a continuous operating value. This is suitable for normal or regular operation of the internal combustion engine. The continuous operating value can vary in particular depending on an instantaneous operating point of the internal combustion engine.

The method proposed in this case and the resulting protective function can easily be implemented via a function to be programmed accordingly in control software for controlling the internal combustion engine. Further safety measures for protection against exiting fuel gases and/or cooling liquid are not necessary. The method is preferably integrated into the starting process for the internal combustion engine. The protection of the internal combustion engine is possible without further protection functions and, in particular, without impairment of normal operation.

The object is also achieved by providing an internal combustion engine which has at least one combustion chamber and an injector assigned to the combustion chamber, which injector is configured to introduce a first, gaseous fuel into the combustion chamber. The injector is also configured to use a second, liquid fuel for its operation, in particular as control oil, as sealing oil and/or as a pilot fuel. The internal combustion engine also has a control device which is operatively connected to the injector and is configured to control the injector in at least one operational cycle in a start-up operation of the internal combustion engine while avoiding complete combustion of the fuel introduced into the combustion chamber via the injector. In particular, the control device is configured to carry out a method according to the invention or a method according to one of the embodiments described above. In particular the advantages which have already been explained above in connection with the method are valid in connection with the internal combustion engine.

The internal combustion engine is preferably designed as a reciprocating piston machine. A piston can be displaced in the combustion chamber by performing a stroke.

An inlet valve, via which fresh mass, in particular combustion air, can be introduced into the combustion chamber, is preferably assigned to the combustion chamber. An outlet valve, via which exhaust gas can be discharged from the combustion chamber, is also assigned to the combustion chamber.

Preferably, a pressure sensor is assigned to the combustion chamber, which pressure sensor is configured and arranged to detect a combustion chamber pressure in the combustion chamber. The pressure sensor is in particular operatively connected to the control device. The control device is preferably configured to detect a time-dependent combustion chamber pressure profile in the combustion chamber.

The internal combustion engine preferably has a starter, in particular an electric starter motor. This is configured to drag the internal combustion engine during start-up operation.

In a preferred embodiment, the injector is designed as a two-component injector.

The description of the method on the one hand and of the internal combustion engine on the other hand are to be understood as complementary to one another. Features of the internal combustion engine which are explicitly or implicitly explained in connection with the method are preferably individual or combined features of a preferred exemplary embodiment of the internal combustion engine. Method steps which are explicitly or implicitly explained in connection with the internal combustion engine are preferably individual or combined steps of a preferred embodiment of the method. The method is preferably characterized by at least one method step which is provided by at least one feature of the internal combustion engine according to the invention or an exemplary embodiment of the internal combustion engine. The internal combustion engine is preferably characterized by at least one feature which is provided by at least one method step of the method according to the invention or a preferred embodiment of the method.

Figure 2:
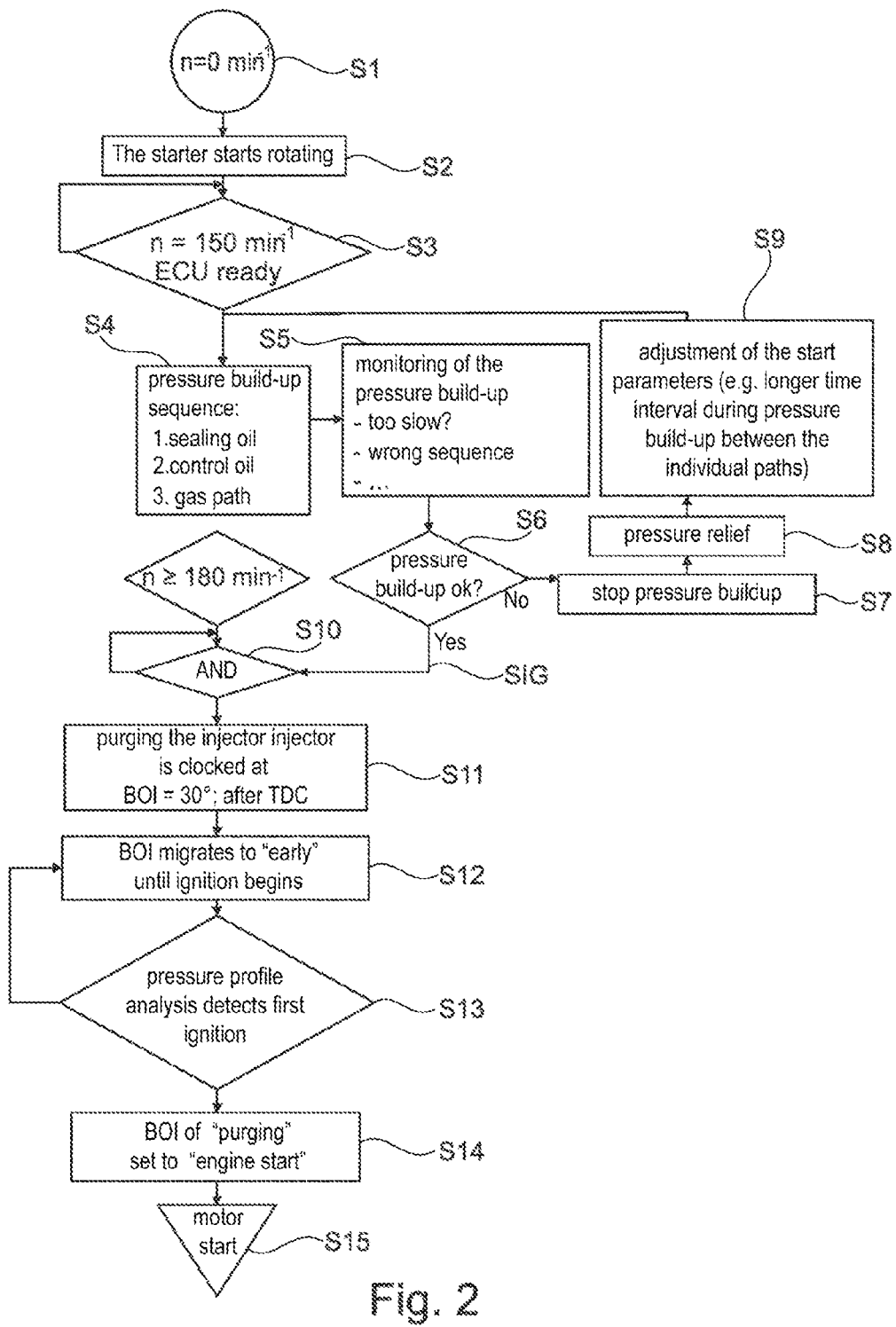

The invention is explained in more detail below with reference to the drawing. In particular:

FIG. 1 shows a schematic representation of an exemplary embodiment of an internal combustion engine, and FIG. 2 shows a schematic representation of an embodiment of a method for operating the internal combustion engine in the manner of a flow chart.

FIG. 1 shows a schematic representation of an exemplary embodiment of an internal combustion engine 1. This has at least one combustion chamber 3, preferably a plurality of combustion chambers 3. An injector 5 is assigned to the combustion chamber 3, which injector is configured to introduce a first gaseous fuel into the combustion chamber 3. The injector 5 is also configured to use a second, liquid fuel for its operation, in particular a control oil, a sealing oil and/or a a pilot fuel.

In a preferred embodiment, the internal combustion engine 1 is configured for a two-component operation, wherein the first gaseous fuel is introduced as a main fuel into the combustion chamber 3, wherein the first gaseous fuel is ignited by introducing an ignition quantity of the second liquid fuel as a pilot fuel into the combustion chamber 3. The pilot fuel can be introduced via an additional, separate injector, or via the injector 5 into the combustion chamber 3. In a preferred embodiment, the second liquid fuel is also introduced via the injector 5 into the combustion chamber 3. The injector 5 is preferably designed as a two-component injector.

The internal combustion engine 1 also has a control device 7, which is operatively connected to the injector 5 and is configured to control the injector 5 in at least one operational cycle in a start-up operation of the internal combustion engine 1 while avoiding complete combustion of the fuel introduced into the combustion chamber 3 via the injector 5. In this way, undesirably present quantities of the second, liquid fuel can be discharged into the combustion chamber 3 without the risk of damaging the chamber or any other parts of the internal combustion engine 1 due to excessively high combustion end pressures due to an excessively large amount of second liquid fuel in the combustion chamber 3.

The control device 7 is configured in particular to control the injector 5 in the start-up operation in the at least one operational cycle at an actuation time within the operational cycle at which no ignition conditions for the second fuel are present in the combustion chamber 3, or it is additionally ensured that the fuel introduced via the injector 5 is at most partially converted.

In particular, the control device 7 is preferably configured to control the injector 5 in the start-up operation in a plurality of operational cycles while avoiding complete combustion of the fuel introduced into the combustion chamber 3 via the injector 5.

A piston 9 is preferably displaceable in the combustion chamber 3 by performing a stroke. The internal combustion engine 1 is preferably designed as a reciprocating piston engine.

An inlet valve 11 for introducing fresh mass into the combustion chamber 3 is preferably assigned to the combustion chamber 3. Furthermore, an outlet valve 13 for discharging exhaust gas from the combustion chamber 3 is preferably assigned to the combustion chamber 3.

The control device 7 is preferably configured to actuate the injector 5 in the start-up operation during a valve overlap phase of the inlet valve 11 and of the outlet valve 13, in particular from 50° C.A before intake TDC of the piston 9 to 50° C.A after intake TDC, preferably from 45° C.A before intake TDC to 45° CA after intake TDC, preferably from 40° C.A before intake TDC to 40° C.A after intake TDC, preferably from 46° C.A before intake TDC to 43° C.A after intake TDC.

The control device 7 is preferably configured to actuate the injector 5 in the start-up operation after a top dead center assigned to an expansion stroke, the expansion TDC of the piston 9, in particular at least 15° C.A to at most 50° CA after expansion TDC, preferably at least 20° C.A to 40° C.A after expansion TDC, preferably at least 25° C.A up to at most 35° C.A after expansion TDC, preferably 30° C.A after expansion TDC.

The control device 7 is preferably configured to select the actuation time at which the injector 5 is actuated during start-up operation after the expansion TDC as a function of a prediction regarding a maximum fuel quantity of the second liquid fuel introduced via the injector 5, in particular in relation to a predetermined maximum mechanical load of the combustion chamber 3.

A pressure sensor 15 is assigned to the combustion chamber 3 and is arranged and configured to detect a combustion chamber pressure in the combustion chamber 3. The control device 7 is operatively connected to the pressure sensor 15 and is preferably configured to detect a temporal combustion chamber pressure profile of the combustion chamber pressure in the combustion chamber 3 by means of the pressure sensor 15. The control device 7 is preferably configured to detect combustion in the combustion chamber 3 on the basis of the detected temporal combustion chamber pressure profile.

The internal combustion engine 1 has a starter 17, in particular an electric starter motor, which is configured to drag the internal combustion engine 1 in start-up operation. For this purpose, the starter 17 is preferably mechanically operatively connectable, in particular drivingly connectable, preferably drivingly connected to a crankshaft 19 of the internal combustion engine 1. In a preferred embodiment, the starter 17 can be mechanically separated from the crankshaft 19 and/or deactivated after start-up operation or for terminating the start-up operation.

FIG. 2 shows a schematic representation of an embodiment of a method for operating the internal combustion engine 1.

The method is started in a first step S1. At this time, the internal combustion engine 1 is at a standstill, its rotational speed n is 0.

In a second step S2, the starter 17, also referred to as starter in FIG. 2, is started. In a third step S3, it is checked whether the rotational speed of the internal combustion engine 1 has reached or exceeded a predetermined initial rotational speed, preferably of 150 rpm. Furthermore, it is checked in step S3 whether the control device 7, or ECU, is ready. If one of these conditions is not fulfilled, the third step S3 is carried out until both conditions are fulfilled.

The method is then continued in a fourth step S4, in that a pressure build-up for the first, gaseous fuel and for the second liquid fuel takes place, preferably in a predetermined sequence. In particular, a sealing oil pressure is preferably initially built up, then a control oil pressure, and finally the pressure for the first, gaseous fuel, which is also referred to as fuel gas for short.

In a fifth step S5, the pressure buildup is monitored, in particular with respect to the time profile of the pressure build-up, wherein it is preferably evaluated whether the pressure build-up is too slow—preferably also with respect to the sequence of the pressure buildup. In a sixth step S6, it is checked whether the pressure buildup is correct. If the pressure buildup is found to be correct, an OK signal SIG is output.

The OK signal SIG is preferably only output when a fuel pressure in a fuel supply system, shown schematically in FIG. 1 and denoted by the reference numeral 21, has reached or exceeded a first fuel pressure limit value for the injector 5 for the first, gaseous fuel, and has reached or exceeded a second fuel pressure limit value for the second liquid fuel. The fuel supply system 21 serves, in particular, for providing the fuels, in particular for providing the control oil, the sealing oil and the fuel gas.

If, also with reference to FIG. 2, the pressure buildup in the sixth step S6 is evaluated as not being OK, the pressure build-up is stopped in a seventh step S7. In an eighth step S8, pressure relief takes place. In a ninth step S9, the start parameters are adapted, for example a longer time interval is provided for the pressure build-up between the individual fuel circuits, and the method is then continued in the fourth step S4 with a renewed pressure buildup.

In a tenth step S10, it is checked whether the OK signal SIG is present, i.e., the pressure buildup is OK, and whether the rotational speed of the internal combustion engine 1 has at the same time reached or exceeded a predetermined limit speed, in particular a starter speed, in particular 180 rpm.

Only if both conditions are met is the method continued in an eleventh step S11. Otherwise, the check is repeated in the tenth step S10 until both conditions are fulfilled.

In the eleventh step S11, the injector 5 is then actuated in at least one operational cycle, preferably in a plurality of operational cycles, preferably in a clocked manner, while avoiding complete combustion of the fuel introduced into the combustion chamber 3 via the injector 5, that is to say it is in particular purged. The fuel is preferably introduced into the combustion chamber 3 at 30° CA after the expansion TDC.

After a predetermined number of actuations of the injector 5 and/or a predetermined number of operational cycles in which the injector 5 has been actuated accordingly, the actuation time is then shifted stepwise so as to be advanced in a twelfth step S12. At the same time, in a thirteenth step S13, it is checked whether a combustion is detected in the combustion chamber 3. The advanced displacement in the twelfth step S12 takes place in particular until combustion is detected in the thirteenth step S13. If this is the case, in a fourteenth step S14 the actuation time is set to a starting operating value, and the internal combustion engine 1 is started or operated in a fifteenth step S15.

Preferably, after an idle speed or nominal rotational speed of the internal combustion engine 1 has been reached, the actuation time for the injector 5 is set to a continuous operating value. This can vary depending on an instantaneous operating point of the internal combustion engine 1.

The invention claimed is:

1. A method for operating an internal combustion engine, the method comprising:
   actuating, during a valve overlap phase during at least one operational cycle of a start-up operation of the internal combustion engine, an injector to introduce a fuel into a combustion chamber of the internal combustion engine; and
   avoiding complete combustion of the fuel introduced into the combustion chamber of the internal combustion engine by the injector;
   wherein the internal combustion engine is configured to introduce a first gaseous fuel into the combustion chamber, and is configured to operate the injector based on a second liquid fuel.

2. The method of claim 1, further comprising actuating the injector at an actuation time within the at least one operational cycle, at which:
   (a) no ignition conditions for the second liquid fuel are present in the combustion chamber, or
   (b) it is ensured that the fuel introduced via the injector is at most partially converted.

3. The method of claim 1, wherein in the start-up operation the injector is actuated in a plurality of operational cycles while avoiding complete combustion of the fuel introduced into the combustion chamber via the injector.

4. The method of claim 1, wherein the injector in the start-up operation, is actuated
   after a top dead center assigned to an expansion cycle of a piston movable by performing a stroke in the combustion chamber in a range between about 15° crank angle (CA) about 50° C. A after the top dead center.

5. The method of claim 4, further comprising:
   predicting a maximum fuel quantity of the second liquid fuel introduced via the injector wherein an actuation time at which the injector is actuated after the top dead center, and
   determining the actuation time at which the injector is actuated after the top dead center, during start-up operation, based on the predicted maximum fuel quantity.

6. The method of claim 1, wherein the injector is actuated during start-up operation only after a predetermined limit speed has been reached or exceeded.

7. The method of claim 1, wherein the injector is only actuated during start-up operation when a pressure in a fuel supply system for the injector has reached or exceeded:
   a) a first fuel pressure limit value for the first gaseous fuel, and
   b) a second fuel pressure limit value for the second liquid fuel.

8. The method of claim 1, further comprising:
   determining that a predetermined number of actuations of the injector have occurred; and
   stepwise displacing an actuation time, at which the injector is actuated during start-up operation until combustion in the combustion chamber is detected.

9. The method of claim 1, further comprising:
   detecting a combustion in the combustion chamber during or after a stepwise advanced displacement of an actuation time; and
   setting the actuation time to a starting operating value based on the detecting.

10. An internal combustion engine comprising:
    at least one combustion chamber having an injector configured to introduce a first gaseous fuel into the combustion chamber, and the injector is configured to use a second liquid fuel for operation of the injector; and
    a control device operatively connected to the injector and configured to actuate the injector in at least one operational cycle in a start-up operation of the internal combustion engine while avoiding complete combustion of the first gaseous fuel, the second liquid fuel, or both introduced into the combustion chamber via the injector during a valve overlap phase.

11. The internal combustion engine of claim 10, wherein the control device is configured to:
    actuate, during the at least one operational cycle of a start-up operation of the internal combustion engine, the injector to introduce the first, gaseous fuel into the combustion chamber of the internal combustion engine; and
    avoid complete combustion of the first gaseous fuel, the second liquid fuel, or both introduced into the combustion chamber of the internal combustion engine by the injector;
    wherein the internal combustion engine is configured to introduce a first gaseous fuel into the combustion chamber, and is configured to operate the injector based on the second liquid fuel.

12. The internal combustion engine of claim 11, further comprising actuating the injector at an actuation time within the at least one operational cycle, at which:
    (a) no ignition conditions for the second liquid fuel are present in the combustion chamber, or
    (b) it is ensured that the first gaseous fuel, the second liquid fuel, or both introduced via the injector is at most partially converted.

13. The internal combustion engine of claim 11, wherein in the start-up operation the injector is actuated in a plurality of operational cycles while avoiding complete combustion of the first gaseous fuel, the second liquid fuel, or both introduced into the combustion chamber via the injector.

14. The internal combustion engine of claim 11, wherein the injector in the start-up operation, is configured to be actuated
after a top dead center assigned to an expansion cycle of a piston movable by performing a stroke in the combustion chamber in a range between about 15° crank angle (CA) and about 50° C.A after the top dead center.

15. The internal combustion engine of claim 14, further comprising:
predicting a maximum fuel quantity of the second liquid fuel introduced via the injector wherein an actuation time at which the injector is actuated after the top dead center, and
determining the actuation time at which the injector is actuated after the top dead center, during start-up operation, based on the predicted maximum fuel quantity.

16. The internal combustion engine of claim 10, wherein the control device is configured to actuate the injector during start-up operation only after a predetermined limit speed has been reached or exceeded.

17. The internal combustion engine of claim 10, wherein the control device is configured to actuate the injector only during start-up operation when a pressure in a fuel supply system for the injector has reached or exceeded:
a) a first fuel pressure limit value for the first gaseous fuel, and
b) a second fuel pressure limit value for the second liquid fuel.

18. The internal combustion engine of claim 10, wherein the control device is further configured to:
determine that a predetermined number of actuations of the injector have occurred; and
stepwise displace an actuation time, at which the injector is actuated during start-up operation until combustion in the combustion chamber is detected.

19. The internal combustion engine of claim 10, wherein the control device is further configured to:
detect a combustion in the combustion chamber during or after a stepwise advanced displacement of an actuation time; and
set the actuation time to a starting operating value based on the detecting a combustion in the combustion chamber.

* * * * *

UNITED STATES PATENT AND TRADEMARK OFFICE
CERTIFICATE OF CORRECTION

PATENT NO. : 12,168,961 B2
APPLICATION NO. : 18/273179
DATED : December 17, 2024
INVENTOR(S) : Felix Neuber et al.

Page 1 of 1

It is certified that error appears in the above-identified patent and that said Letters Patent is hereby corrected as shown below:

On the Title Page

Column 1 item (73) (Assignee), Line 1, please delete "GmbH" and insert therefore -- GmbH, Stuttgart (DE) --.

Signed and Sealed this
Eighth Day of April, 2025

Coke Morgan Stewart
*Acting Director of the United States Patent and Trademark Office*